(12) United States Patent
Okada

(10) Patent No.: US 8,981,304 B2
(45) Date of Patent: Mar. 17, 2015

(54) RADIATION DETECTOR

(75) Inventor: Yoshihiro Okada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1018 days.

(21) Appl. No.: 12/974,707

(22) Filed: Dec. 21, 2010

(65) Prior Publication Data

US 2011/0180714 A1    Jul. 28, 2011

(30) Foreign Application Priority Data

Jan. 25, 2010  (JP) ................................ 2010-013484

(51) Int. Cl.
*G01T 1/00* (2006.01)
*G01T 1/24* (2006.01)
*G01T 1/20* (2006.01)

(52) U.S. Cl.
CPC .............. *G01T 1/243* (2013.01); *G01T 1/2018* (2013.01)
USPC ................................... 250/354.1; 250/370.08

(58) Field of Classification Search
CPC ............. G01T 1/00; G01T 1/20; G01T 1/243; H05G 1/44
USPC .............................. 250/354.1, 370.08, 370.11
See application file for complete search history.

(56) References Cited

U.S. PATENT DOCUMENTS

| | | | | |
|---|---|---|---|---|
| 4,972,458 | A | * | 11/1990 | Plewes .......................... 378/146 |
| 5,585,638 | A | * | 12/1996 | Hoffman ................... 250/370.07 |
| 5,751,783 | A | | 5/1998 | Granfors et al. |
| 5,757,884 | A | | 5/1998 | Alexandrescu |
| 7,211,880 | B2 | * | 5/2007 | Izumi ............................. 257/678 |
| 7,569,832 | B2 | * | 8/2009 | Tredwell et al. .......... 250/370.11 |
| 8,664,615 | B2 | * | 3/2014 | Amitani et al. ........... 250/370.09 |
| 2001/0028701 | A1 | | 10/2001 | Schulz |

(Continued)

FOREIGN PATENT DOCUMENTS

| | | |
|---|---|---|
| CN | 1455580 A | 11/2003 |
| CN | 101207143 A | 6/2008 |

(Continued)

OTHER PUBLICATIONS

Notice of Reasons for Rejection, dated Jul. 30, 2013, issued in corresponding JP Application No. 2010-013484, 2 pages in English and Japanese.

(Continued)

*Primary Examiner* — David Porta
*Assistant Examiner* — Faye Boosalis
(74) *Attorney, Agent, or Firm* — Sughrue Mion, PLLC

(57) ABSTRACT

The present invention provides a radiation detector including: a wavelength conversion unit that converts irradiated radiation to a radiation with a second wavelength; a first substrate that has a first and a second surface; radiation detecting pixels, disposed in a matrix on the first surface, that accumulate charges generated by irradiation of the radiation with the second wavelength, and that include switching elements to read out the charges; scan lines, provided on the first surface, through which a control signal, that switches each switching element provided in each radiation detecting pixel, flows; signal lines, provided on the first surface, through which an electric signal flows, the electric signal corresponding to the charges accumulated in each radiation detecting pixel; and a second substrate, provided on the second surface, that includes radiation irradiation detecting sensors that generate charges due to irradiation of the radiation having the second wavelength.

16 Claims, 14 Drawing Sheets

(56) References Cited

U.S. PATENT DOCUMENTS

| | | |
|---|---|---|
| 2003/0213914 A1 | 11/2003 | Kobayashi et al. |
| 2005/0279943 A1 | 12/2005 | Kobayashi et al. |
| 2007/0221857 A1 | 9/2007 | Kobayashi et al. |
| 2008/0210946 A1 | 9/2008 | Okada et al. |
| 2009/0310749 A1 | 12/2009 | Kojima |
| 2011/0180714 A1 | 7/2011 | Okada |

FOREIGN PATENT DOCUMENTS

| | | | |
|---|---|---|---|
| JP | 2-143188 A | | 6/1990 |
| JP | 07027864 A | | 1/1995 |
| JP | 9-073144 A | | 3/1997 |
| JP | 09073144 A | * | 3/1997 |
| JP | 09-307088 A | | 11/1997 |
| JP | 10284289 A | | 10/1998 |
| JP | 11174156 A | | 7/1999 |
| JP | 2001311778 A | | 11/2001 |
| JP | 4217506 B2 | | 2/2002 |
| JP | 2002055164 A | | 2/2002 |
| JP | 2004273747 A | | 9/2004 |
| JP | 2007147370 A | | 6/2007 |
| JP | 2009297273 A | | 12/2009 |
| JP | 5448877 B2 | | 3/2014 |

OTHER PUBLICATIONS

First Notification of Office Action, dated Dec. 17, 2013, issued in corresponding CN Application No. 201010614012.5, 28 pages in English and Chinese.

Notice of Reasons for Rejection, dated Feb. 19, 2013, issued in corresponding JP Application No. 2009-013484, 5 pages in English and Japanese.

Third Notification of Office Action, dated Nov. 15, 2014, issued in corresponding CN Application No. 201010614012.5, 23 pages in English and Chinese.

Notice of Reasons for Rejection, dated Nov. 11, 2014, issued in related JP Application No. 2013-264096, 4 pages in English and Japanese.

* cited by examiner

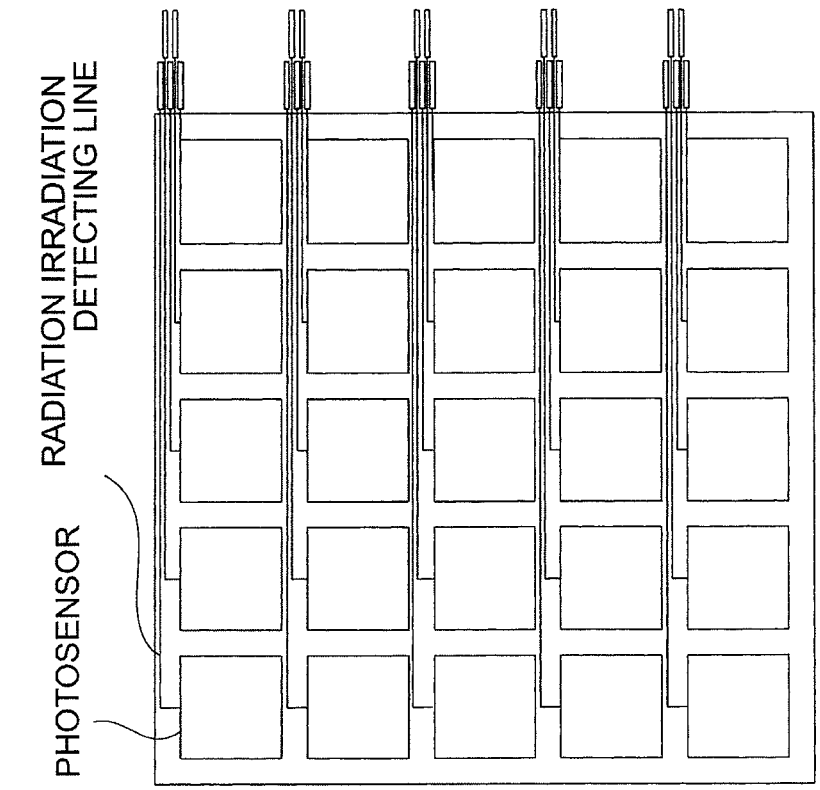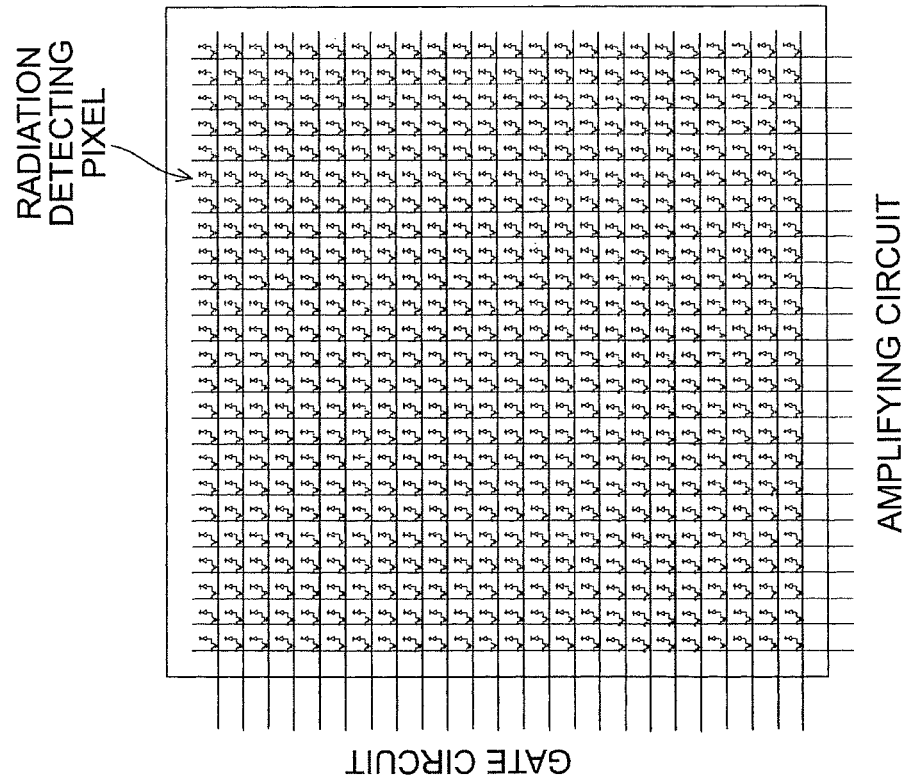

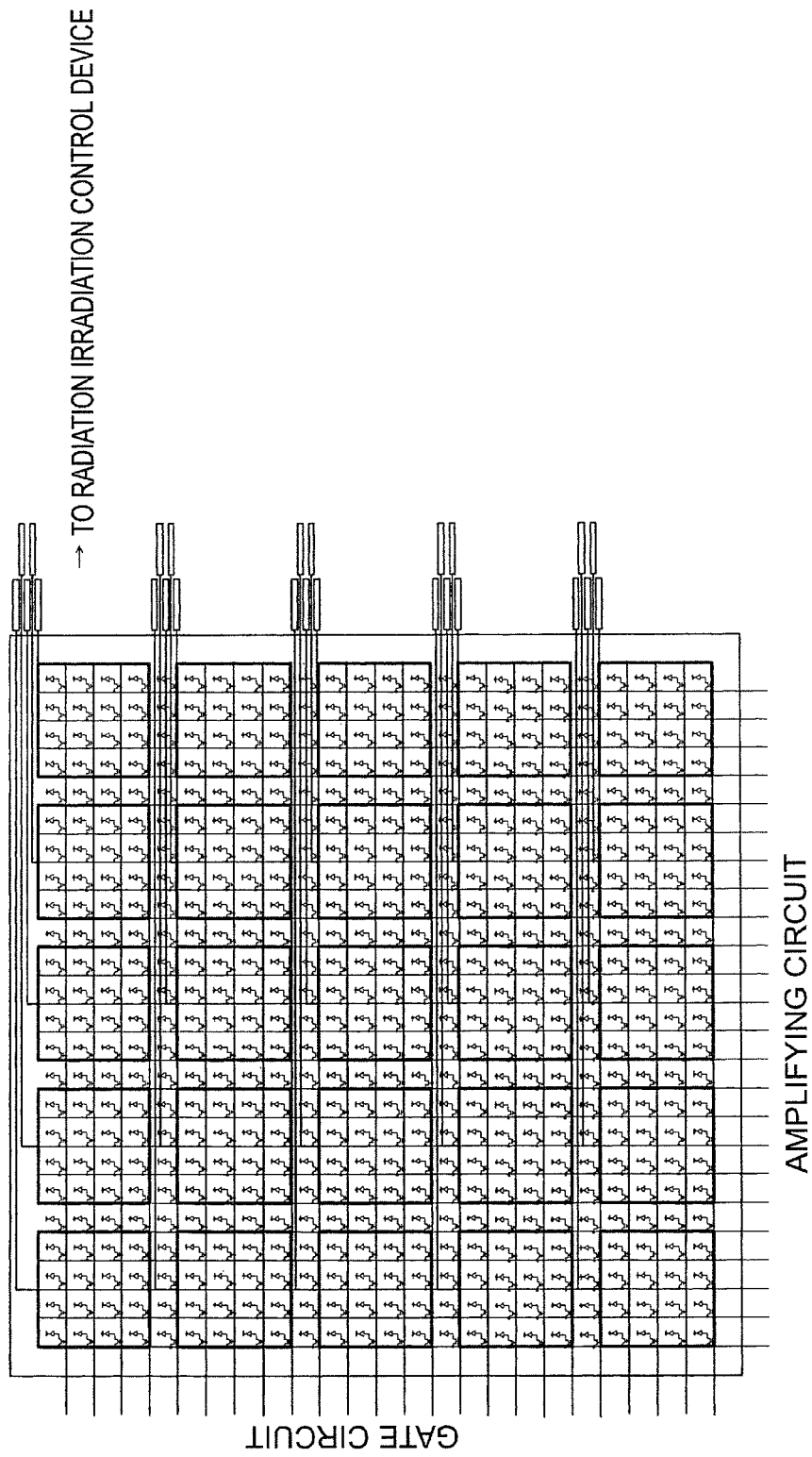

RADIATION DETECTOR

CROSS-REFERENCE TO RELATED APPLICATION

This application claims priority under 35 USC 119 from Japanese Patent Application No. 2010-013484, filed on Jan. 25, 2010 the disclosure of which is incorporated by reference herein.

BACKGROUND OF THE PRESENT INVENTION

1. Field of the Present Invention

The present invention relates to a radiation detector. In particular, the present invention relates to a radiation detector that includes plural pixels disposed in a matrix, that accumulates charges generated due to irradiation of radiation, and that detects the accumulated charge amount as information that represents an image.

2. Description of the Related Art

Recently, radiographic imaging devices (radiation image detection device) have been put into practice employing a radiation detector (radiation detection element) of a FPD (flat panel detector), or the like. Such radiation detector have an X-ray sensitive layer disposed on a TFT (Thin Film Transistor) active matrix substrate, and are able to directly convert X-ray information into digital data. Such FPDs have the merit that, in comparison to with previous imaging plates, images can be more immediately checked and video images can also be checked. Consequently the introduction of FPDs is proceeding rapidly.

Various types are proposed for such radiation detection elements. There are, for example, direct-conversion-type radiation detection elements that convert radiation directly to charge in a semiconductor layer, and accumulate the charge. There are also indirect-conversion-type radiation detection elements that first convert radiation into light with a scintillator, such as CsI:Tl, GOS ($Gd_2O_2S$:Tb) or the like, then convert the converted light into charge in a semiconductor layer and accumulate the charge.

A technology of using AEC sensors for detecting a total radiation irradiation amount to control a radiation source irradiating the radiation is known (for example, refer to Japanese Patent No. 4217506). In the technology described in Japanese Patent No. 4217506, AEC sensors (second radiation conversion elements) are formed in gaps between first radiation conversion elements (radiation detecting elements). In the technology described in Japanese Patent No. 4217506, the AEC sensors are formed on the same substrate as a substrate where the first radiation detection elements are formed.

According to the technology described in Japanese Patent No. 4217506, the AEC sensors are incorporated in the substrate where the first radiation detection elements, that are expensive components, are provided in a matrix. Therefore, when manufacturing defects occur in the AEC sensors or lines thereof, each substrate becomes a defective substrate. Namely, when manufacturing defects occur in the AEC sensors or lines thereof, each substrate needs to be discarded, even if manufacturing defects did not occur in the first radiation conversion elements provided in the matrix. Therefore, in the technology described in Japanese Patent No. 4217506, a manufacturing cost may be extraordinarily increased. When production of the substrate is finished, a shipping inspection is performed on the substrate where the AEC sensors are incorporated and the first radiation conversion elements are provided in the matrix. For this reason, a yield of the substrate may be represented by the following Expression.

Yield=yield rate of first radiation conversion elements×yield rate of AEC sensors

SUMMARY OF THE PRESENT INVENTION

The present invention provides a radiation detector that may reduce a manufacturing cost thereof.

The first aspect of the present invention is a radiation detector, including: a wavelength conversion unit that converts irradiated radiation having a first wavelength into radiation having a second wavelength; a first substrate that has a first surface and a second surface different from the first surface; a plurality of radiation detecting pixels, disposed in a matrix on the first surface, that accumulate charges generated due to irradiation of the radiation having the second wavelength, and that include switching elements to read out the accumulated charges; a plurality of scan lines, provided on the first surface, through which a control signal, that switches each switching element provided in each radiation detecting pixel, flows; a plurality of signal lines, provided on the first surface, through which an electric signal flows, the electric signal corresponding to the charges accumulated in each radiation detecting pixel according to a switching state of each switching element; and a second substrate, provided on the second surface of the first substrate, that includes a plurality of radiation irradiation detecting sensors that generate charges due to irradiation of the radiation having the second wavelength being irradiated onto the first surface and emitted from the second surface.

Note that, the radiation irradiation detecting sensors may be disposed on a part of the second substrate or may be disposed on the entire surface of the second substrate.

According to the first aspect of the present invention, the radiation detecting pixels and the radiation irradiation detecting sensors are provided on the different substrates, respectively. Accordingly, in the first aspect, a yield of the radiation detecting pixels and a yield of the radiation irradiation detecting sensors may be separated from each other. Therefore, in the first aspect, when manufacturing defects occur in the radiation irradiation detecting sensors, only the second substrate may become a defective substrate and the first substrate does not become a defective substrate. Namely, in the first aspect, even when the manufacturing defects occur in the radiation irradiation detecting sensors, the first substrate where the plural radiation detecting pixels are disposed in the matrix is not discarded.

Therefore, according to the first aspect, a manufacturing cost may be reduced.

According to the first aspect, the radiation irradiation detecting sensors are not provided between the radiation detecting pixels. Accordingly, as compared with the conventional art where the AEC sensors (second radiation conversion elements) are formed in the gaps between the first radiation conversion elements (radiation detecting elements), an effective detection area of the radiation detecting pixels may be enlarged in the first aspect. Therefore, according to the first aspect, the accuracy of radiation detection in the present exemplary embodiment may be improved.

According to the first aspect of the present invention, the second substrate where the plural radiation irradiation detecting sensors are disposed is provided on the side of the second surface of the first. Accordingly, in the first aspect, the radiation (for example, light) having the second wavelength may be received at an amount greater than the amount of radiation in the case in which the AEC sensors are formed in the gaps between the radiation detecting TFTs. As a result, according to the first aspect of the present invention, detection sensitivity becomes high. When the AEC sensors are formed in the gaps of the TFTs, the radiation having the second wavelength is received by the sensor unit of the AEC sensor with an area smaller than the gap where the AEC sensors are provided. Meanwhile, in the first aspect of the present invention, the AEC sensor is disposed on the top surface of the TFT. Therefore, according to the first aspect, the AEC sensors may be disposed in the entire gaps of the TFTs, and the radiation having the second wavelength that is leaked from the gaps and is emitted may be received at a large amount.

According to the first aspect of the present invention, the light, converted by the same wavelength conversion unit, is detected by the radiation detecting pixel and the radiation irradiation detecting sensor. Therefore, in the first aspect of the present invention, as compared with the case in which the radiation is detected by the external AEC sensor, the difference of the pixel detection and the radiation irradiation amount detection based on the irradiation conditions may be reduced.

A second aspect of the present invention is a radiation detector, including: a wavelength conversion unit, having a first surface and a second surface, that converts irradiated radiation having a first wavelength into radiation having a second wavelength and that emits the radiation having the second wavelength from both surfaces; a first substrate that is provided on the first surface of the wavelength conversion unit; a plurality of radiation detecting pixels, disposed in a matrix on the first substrate, that accumulate charges generated due to irradiation of the radiation emitted from the first surface of the wavelength conversion unit and having the second wavelength, and that include switching elements to read out the accumulated charges; a plurality of scan lines, provided on the first substrate, through which a control signal, that switches each switching element provided in each radiation detecting pixel, flows; a plurality of signal lines, provided on the first substrate, through which an electric signal flows, the electric signal corresponding to the charges accumulated in each radiation detecting pixel according to a switching state of each switching element; and a second substrate, provided on the second surface of the wavelength conversion unit, that includes a plurality of radiation irradiation detecting sensors that generate charges due to irradiation of the radiation having the second wavelength emitted from the second surface of the wavelength conversion unit.

Namely, the radiation irradiation detecting sensors may be disposed on a part of the second substrate or may be disposed on the entire surface of the second substrate.

According to the second aspect of the present invention, the radiation detecting pixels and the radiation irradiation detecting sensors are provided on the different substrates, respectively. Accordingly, in the second aspect, a yield of the radiation detecting pixels and a yield of the radiation irradiation detecting sensors may be separated from each other. Therefore, in the second aspect, when manufacturing defects occur in the radiation irradiation detecting sensors, only the second substrate may become a defective substrate and the first substrate does not become a defective substrate. Namely, in the second aspect, even when the manufacturing defects occur in the radiation irradiation detecting sensors, the first substrate where the plural radiation detecting pixels are disposed in the matrix is not discarded.

Therefore, according to the second aspect, a manufacturing cost may be reduced.

According to the second aspect, the radiation irradiation detecting sensors are not provided between the radiation detecting pixels. For this reason, as compared with the related art where the AEC sensors (second radiation conversion elements) are formed in the gaps between the first radiation conversion elements (radiation detecting elements), an effective detection area of the radiation detecting pixels may be enlarged in the second aspect. Therefore, according to the second aspect, the accuracy of radiation detection in the present exemplary embodiment may be improved.

According to the second aspect of the present invention, the second substrate where the plural radiation irradiation detecting sensors are disposed is provided on the side of the other surface of the wavelength conversion unit. Accordingly, in the second aspect, the radiation (for example, light) having the second wavelength may be received at an amount greater than the amount of radiation in the case where the AEC sensors are formed in the gaps between the radiation detecting TFTs. As a result, according to the second aspect of the present invention, detection sensitivity becomes high. When the AEC sensors are formed in the gaps of the TFTs, the radiation having the second wavelength is received by the sensor unit of the AEC sensor with an area smaller than the gap where the AEC sensors are provided. Meanwhile, in the second aspect of the present invention, the AEC sensor is disposed on the top surface of the TFT. Therefore, according to the second aspect, the AEC sensors may be disposed in the entire gaps of the TFTs, and the radiation having the second wavelength that is leaked from the gaps and is emitted may be received at a large amount.

According to the second aspect of the present invention, the light that is converted by the same wavelength conversion unit is detected by the radiation detecting pixel and the radiation irradiation detecting sensor. Therefore, in the second aspect of the present invention, as compared with the case in which the irradiation amount is detected by the external AEC sensor, the difference of the image detection and the radiation irradiation amount detection based on the irradiation conditions may be reduced.

According to a third aspect of the present invention, in the above aspects, may further include: radiation irradiation detecting lines, each connected to one of the radiation irradiation detecting sensors, through which electric signals corresponding to the charges generated by the radiation irradiation detecting sensors flow; and a radiation irradiation control device, connected to each of the radiation irradiation detecting lines, that detects an irradiation amount of radiation having the first wavelength, and controls a radiation source to irradiate the radiation having the first wavelength on the basis of the detected irradiation amount.

According to a fourth aspect of the present invention, in the above aspects, the radiation irradiation detecting sensors may be provided on an entire surface of the second substrate.

According to a fifth aspect of the present invention, in the above aspects, the second substrate may include a resin substrate.

According to a sixth aspect of the present invention, in the above aspects, the radiation irradiation detecting sensors may include an organic material.

According to a seventh aspect of the present invention, in the above aspects, the radiation irradiation detecting sensors may include an inorganic material.

According to an eighth aspect of the present invention, in the above aspects, the wavelength conversion unit may include GOS.

According to a ninth aspect of the present invention, in the above aspects, the wavelength conversion unit may include CsI.

According to a tenth aspect of the present invention, in the above aspects, the radiation irradiation detecting sensors may detect at least one of, start of irradiation of the radiation, completion of the irradiation of the radiation, and an amount of irradiated radiation.

As such, according to the aspects of the present invention, a manufacturing cost may be reduced.

BRIEF DESCRIPTION OF THE DRAWINGS

Exemplary embodiments of the present invention will be described in detail based on the following figures, wherein:

FIG. 9A and FIG. 9B are schematic views of the photosensor-attached TFT array substrate and an AEC photosensor array substrate according to the first exemplary embodiment;

FIG. 13A and FIG. 13B are diagrams showing the configuration of a radiation detector of the radiation image detection device according to the second exemplary embodiment.

DETAILED DESCRIPTION OF THE PRESENT INVENTION

Hereinafter, exemplary embodiments of the present invention will be described with reference to the drawings.

[First Exemplary Embodiment]

First, the first exemplary embodiment will be described. In the present exemplary embodiment, the case in which the present invention is applied to a radiation detector 10A of an indirect-conversion-type will be described. The indirection-conversion-type radiation detector converts radiation having the first wavelength into radiation having the second wavelength, and converts the converted radiation having the second wavelength into charges. In the following description, there will be described an example of the case in which the radiation having the first wavelength is simply called "radiation (for example, X-rays)" and the radiation having the second wavelength different from the first wavelength is "light." However, the radiation having the first wavelength and the radiation having the second wavelength are not limited thereto.

Figure 1:
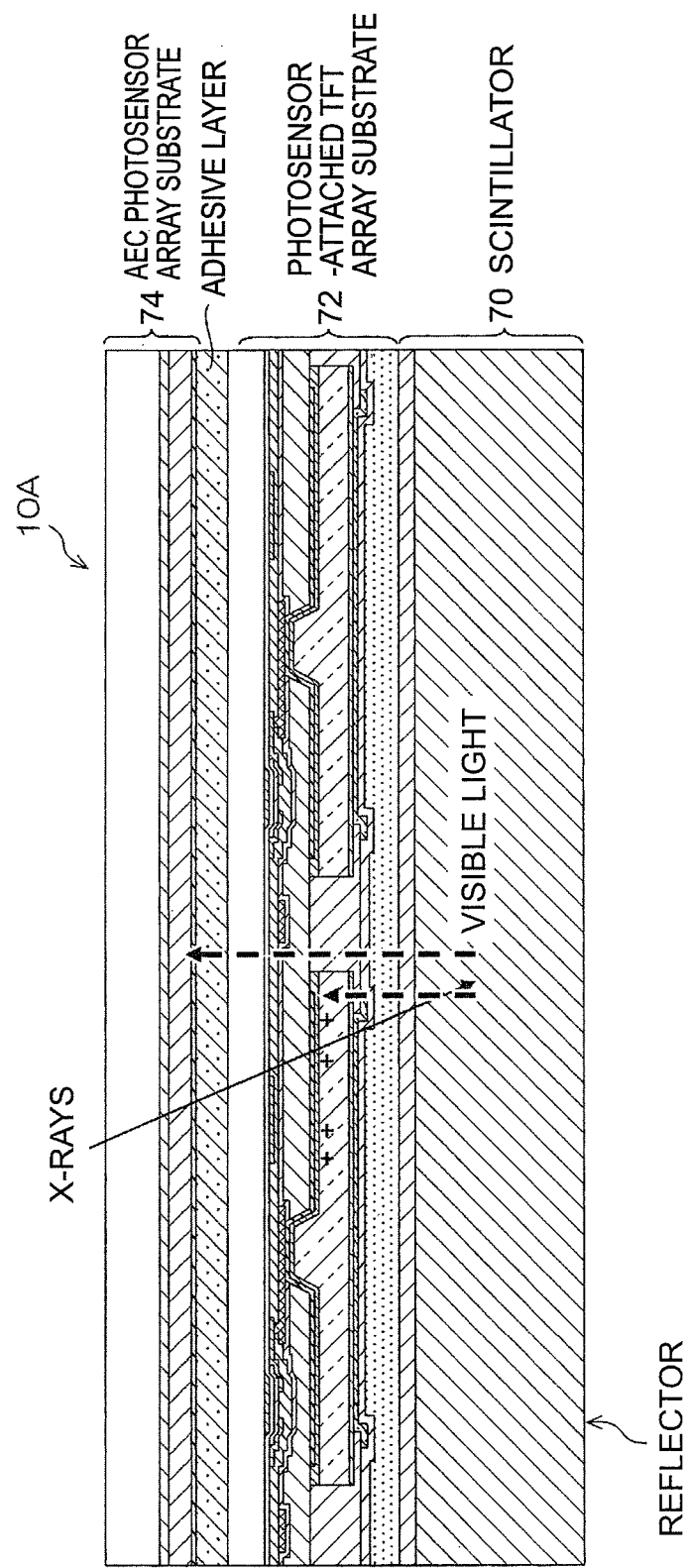
FIG. 1 is a diagram showing the configuration of a radiation detector of a radiation image detection device according to a first exemplary embodiment of the present invention.
Figure 2:
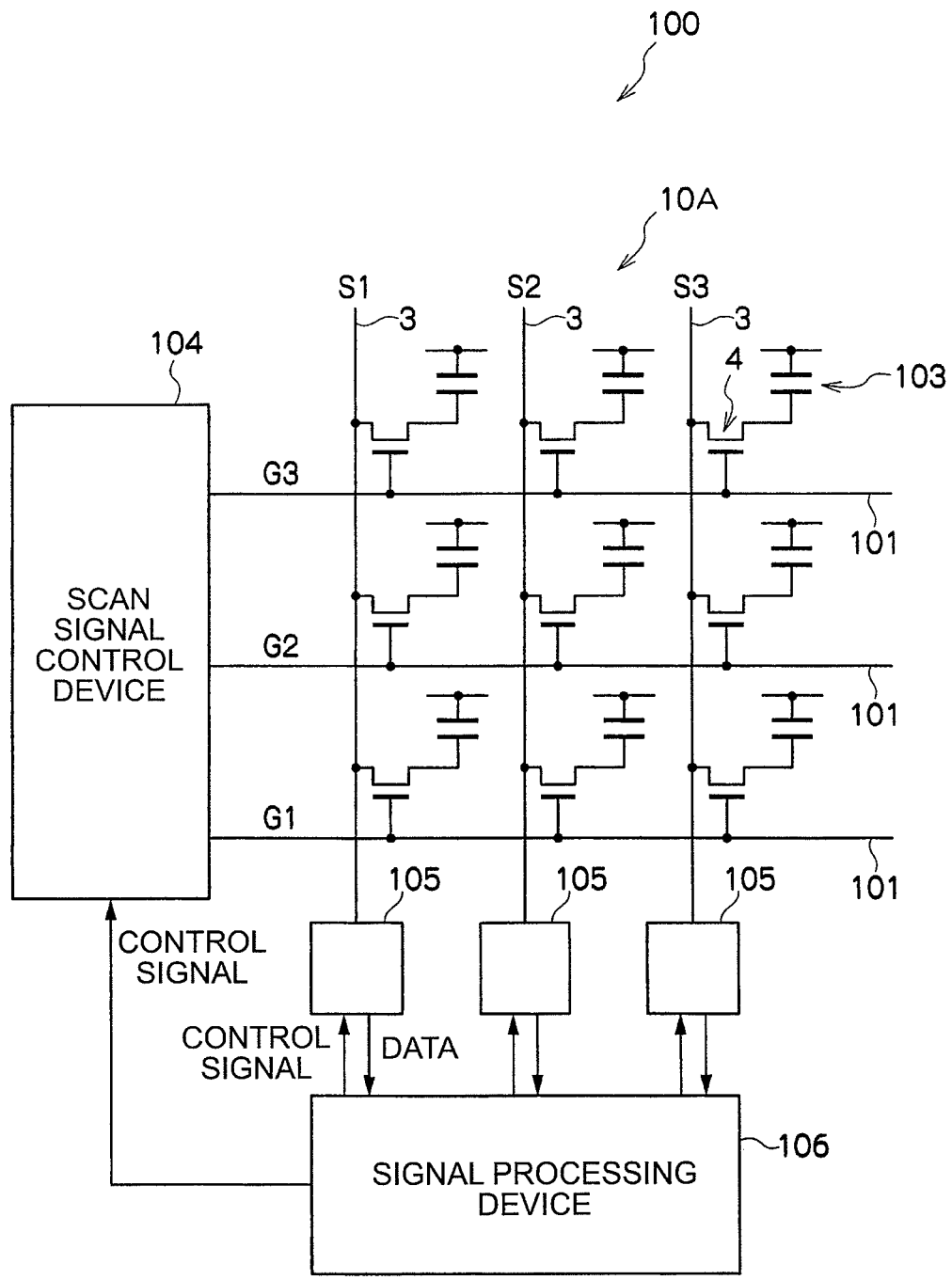
FIG. 2 is a diagram showing the configuration of the radiation detector of the radiation image detection device according to the first exemplary embodiment.

FIG. 1 and FIG. 2 show the entire configuration of a radiation imaging device (radiation image detection device) 100 using the radiation detector 10A according to the first exemplary embodiment. In FIG. 2, a scintillator 70 and an AEC photosensor array substrate 74 are not shown.

The radiation imaging device 100 according to the present exemplary embodiment includes the radiation detector 10A of the indirect-conversion-type.

The radiation detector 10A includes the scintillator 70, the photosensor-attached TFT array substrate 72, and the AEC photosensor array substrate 74.

The scintillator 70 converts the irradiated radiation into light and emits the light. According to the present exemplary embodiment, as shown in FIG. 1, a reflector that reflects light is provided in a lower portion of the scintillator 70. Note that the scintillator 70 corresponds to a wavelength conversion unit (wavelength conversion layer) of the present invention.

On the photosensor-attached TFT array substrate 72, pixels each of which includes a sensor unit 103 and a TFT switch 4 are arranged two-dimensionally. The sensor unit 103 includes an upper electrode, a semiconductor layer, and a lower electrode to be described below, and receives light obtained by converting the irradiated radiation by the scintillator and accumulates charges. The TFT switch 4 reads the charges that are accumulated in the sensor unit 103.

On the photosensor-attached TFT array substrate 72, plural scan lines 101 and plural signal lines 3 are provided to intersect each other. The scan lines 101 turn ON/OFF the TFT switches 4. The signal lines 3 read the charges that are accumulated in the sensor unit 103.

When any TFT switch 4 connected to the signal line 3 is turned ON, an electric signal according to the charge amount accumulated in the sensor unit 103 is output to each signal line 3. To each signal line 3, a signal detecting circuit 105 that detects the output electric signal is connected. To each scan line 101, a scan signal control device 104 that outputs a control signal to turn ON/OFF each TFT switch 4 to each scan line 101 is connected.

The signal detecting circuit 105 includes an amplifying circuit that amplifies the input electric signal, for each signal line 3. In the signal detecting circuit 105, the electric signal that is input from each signal line 3 is amplified by the amplifying circuit and is detected. Accordingly, the signal detecting circuit 105 detects the charge amount accumulated in each sensor unit 103 as information of each of the pixels constituting an image.

A signal processing device 106 is connected to the signal detecting circuit 105 and the scan signal control device 104. The signal processing device 106 executes predetermined processing on the electric signal detected in the signal detecting circuit 105. In addition, the signal processing device 106 outputs a control signal indicating signal detection timing to the signal detecting circuit 105, and outputs a control signal indicating output timing of a scan signal to the scan signal control device 104.

Figure 3:
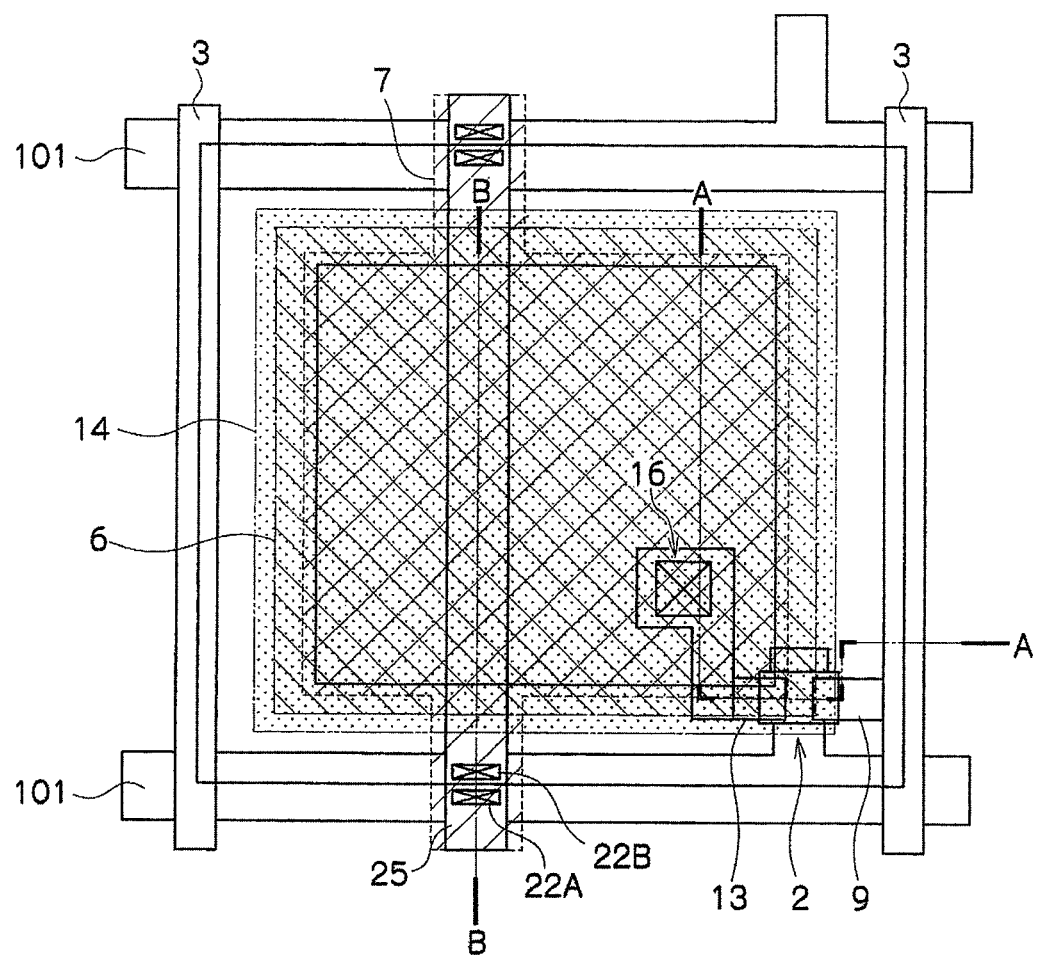
FIG. 3 is a plan view showing the configuration of the radiation detector according to the first exemplary embodiment.
Figure 4A:
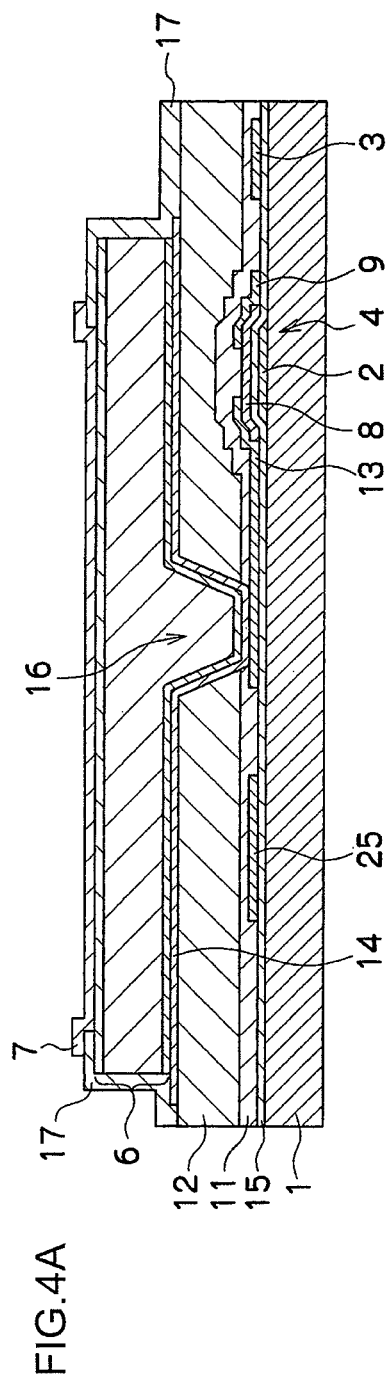
FIG. 4A and FIG. 4B are cross-sectional views of the radiation detector according to the first exemplary embodiment.
Figure 4B:
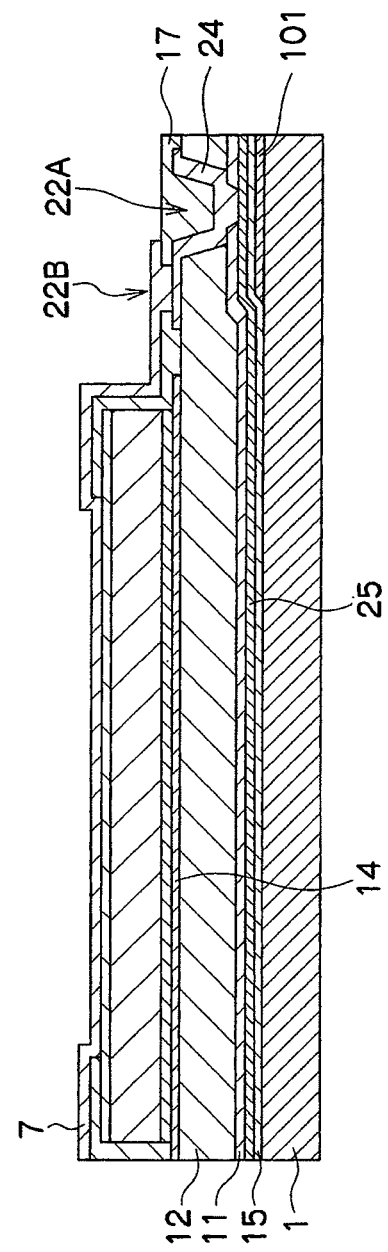

Next, the photosensor-attached TFT array substrate 72 according to the present exemplary embodiment will be described in detail with reference to FIG. 3, FIG. 4A and FIG. 4B. FIG. 3 is a plan view showing a structure of each pixel of the radiation detection element on the photosensor-attached TFT array substrate 72 according to the present exemplary embodiment. FIG. 4A is a cross-sectional view taken along the line A-A of FIG. 3. FIG. 4B is a cross-sectional view taken along the line B-B of FIG. 3.

As shown in FIG. 4A and FIG. 4B, in the radiation detection element according to the present exemplary embodiment, the scan lines 101 and gate electrodes 2 are formed on an insulating substrate 1 made of alkali-free glass. The scan lines 101 and the gate electrodes 2 are connected to each other (refer to FIG. 3). The wiring layer in which this scan lines 101 and gate electrodes 2 are formed (this wiring layer is referred to below as "the first signal wiring layer") is formed from Al and/or Cu, or a layered film mainly composed of Al and/or Cu. However, the material of the first signal wiring layer is not limited thereto.

On the scan lines 101 and the gate electrodes 2, an insulating film 15 is formed on one surface to cover the scan lines 101 and the gate electrodes 2. The locations of the insulation film 15 positioned over the gate electrodes 2 are employed as a gate insulation film in the TFT switches 4. The insulation film 15 is, for example, formed from $SiN_x$ or the like by, for example, Chemical Vapor Deposition (CVD) film forming.

An island shape of a semiconductor active layer 8 is formed on each of the gate electrodes 2 above the insulation film 15. The semiconductor active layer 8 is a channel portion of the TFT switch 4 and is, for example, formed from an amorphous silicon film.

On the above mentioned layers, a source electrode 9 and a drain electrode 13 are formed. In the wiring layer where the source electrode 9 and the drain electrode 13 are formed, the signal lines 3 and common electrode lines 25 parallel to the signal lines 3 are formed. The source electrode 9 is connected to the signal line 3. The wiring layer in which the source electrode 9, the signal lines 3, and common electrode lines 25 (this wiring layer is referred to below as "the second signal wiring layer") is formed from Al and/or Cu, or a layered film mainly composed of Al and/or Cu. However, the material of the second signal wiring layer is not limited thereto.

Between the source electrode 9 and the drain electrode 13 and the semiconductor active layer 8, a contact layer (not shown in the drawings) is formed. The contact layer is formed of an impurity doped semiconductor layer that is made of impurity doped amorphous silicon. The TFT switch 4 employed for switching is configured as described above.

A TFT protecting layer 11 is formed over substantially the whole surface (substantially the entire region) of regions provided with the pixels above the substrate 1 so as to cover the semiconductor active layer 8, the source electrode 9, the drain electrode 13, the signal line 3, and the common electrode line 25. The TFT protection layer 11 is formed, for example, from $SiN_x$ or the like, by, for example, CVD film forming.

A coating type intermediate insulation film 12 is formed above the TFT protection layer 11. This intermediate insulation film 12 is formed from a photosensitive organic material of low permittivity (dielectric constant $\varepsilon_r = 2$ to 4) (for example, a material such as a positive-working photosensitive acrylic resin: a base polymer of a copolymer of methacrylic acid and glycidyl methacrylate, into which a naphthoquinone-diazido positive-working photosensitive agent has been mixed). The film thickness of the intermediate insulation film 12 is 1 to 4 µm. In the radiation detection device 10 according to the present exemplary embodiment, capacitance between the metal layers disposed above and below the intermediate insulation film 12 can be suppressed to a low value by provision of the intermediate insulation film 12. Furthermore, generally such materials also have the functionality of a flattening layer, and exhibit the effect of flattening the steps in the layer below. As a result, since the shape of a semiconductor layer 6 disposed on the upper layer is flattened, absorption efficiency may be prevented from being lowered due to unevenness of the semiconductor layer 6, and a leak current may be suppressed from being increased. In the interlayer insulating film 12 and the TFT protecting layer 11, a contact hole 16 and a contact hole 22A are formed at a position facing the drain electrode 13 and the position of the irradiation surface side of the region where the scan line 101 is formed, respectively.

On the interlayer insulating film 12, a lower electrode 14 of the sensor unit 103 is formed to cover the pixel region, while filling the contact hole 16. The lower electrode 14 is connected to the drain electrode 13 of the TFT switch 4. As long as the lower electrode 14 is electrically conductive, there are no particular limitations to the material of the lower electrode 14 for cases in which the thickness of a semiconductor layer 6, described below, is about 1 µm. Hence the lower electrode 14 may be formed with an electrically conductive metal such as, for example, an Al based material, ITO or the like.

However, in cases in which the film thickness of the semiconductor layer 6 is thin (about 0.2 to 0.5 µm), light is not sufficiently absorbed by the semiconductor layer 6, and measures need to be taken to prevent an increase in leak current flow due to light illumination onto the TFT switch 4. Consequently, in such cases the lower electrode 14 is preferably an alloy or layered film with a metal having light-blocking ability as a main component.

On the lower electrode 14, the semiconductor layer 6 that functions as a photodiode is formed. In the present exemplary embodiment, a photodiode having a PIN structure is employed as the semiconductor layer 6. Therefore, the semiconductor layer 6 is formed by sequentially layering an $n^+$ layer, an i layer, and a $p^+$ layer from the lower layer. In the present exemplary embodiment, the lower electrode 14 is formed to be thicker than the semiconductor layer 6. When the semiconductor layer 6 is thin (for example, in the case of having the thickness of 0.5 µm or less), it is preferable that a light shielding metal be disposed to cover the TFT switch 4 to prevent light from being incident on the TFT switch 4.

In the present exemplary embodiment, the distance from a channel unit of the TFT switch 4 to an end portion of the lower electrode 14 made of the light shielding metal is secured by 5 µm or more to suppress light from entering into the TFT switch 4 due to diffused reflection of the light in the device.

On the interlayer insulating film 12 and the semiconductor layer 6, a protective insulating film 17 that has an opening in a portion of the semiconductor layer 6 is formed. On the semiconductor layer 6 and the protective insulating film 17, an upper electrode 7 is formed to cover at least the opening of the protective insulating film 17. The upper electrodes 7 are, for example, formed using a material having high light transmissive, such as ITO, Indium Zinc Oxide (IZO) or the like. The upper electrode 7 functions as a conductive member that is connected to the common electrode line 25 to supply a bias voltage to the upper electrode 7 disposed on a lower layer. As shown in FIG. 4B, the common electrode line 25 is connected to a contact pad 24 formed on a layer of the lower electrode 14 through the contact hole 22A provided in the first interlayer insulating film 12. By covering a contact hole 22B provided in the protective insulating film 17 with the upper electrode 7, the upper electrode 7 and the common electrode line 25 are electrically connected to each other.

Note that the upper electrode 7 and the conductive member connected to the common electrode line 25 may be formed of metals of different layers.

Figure 5:
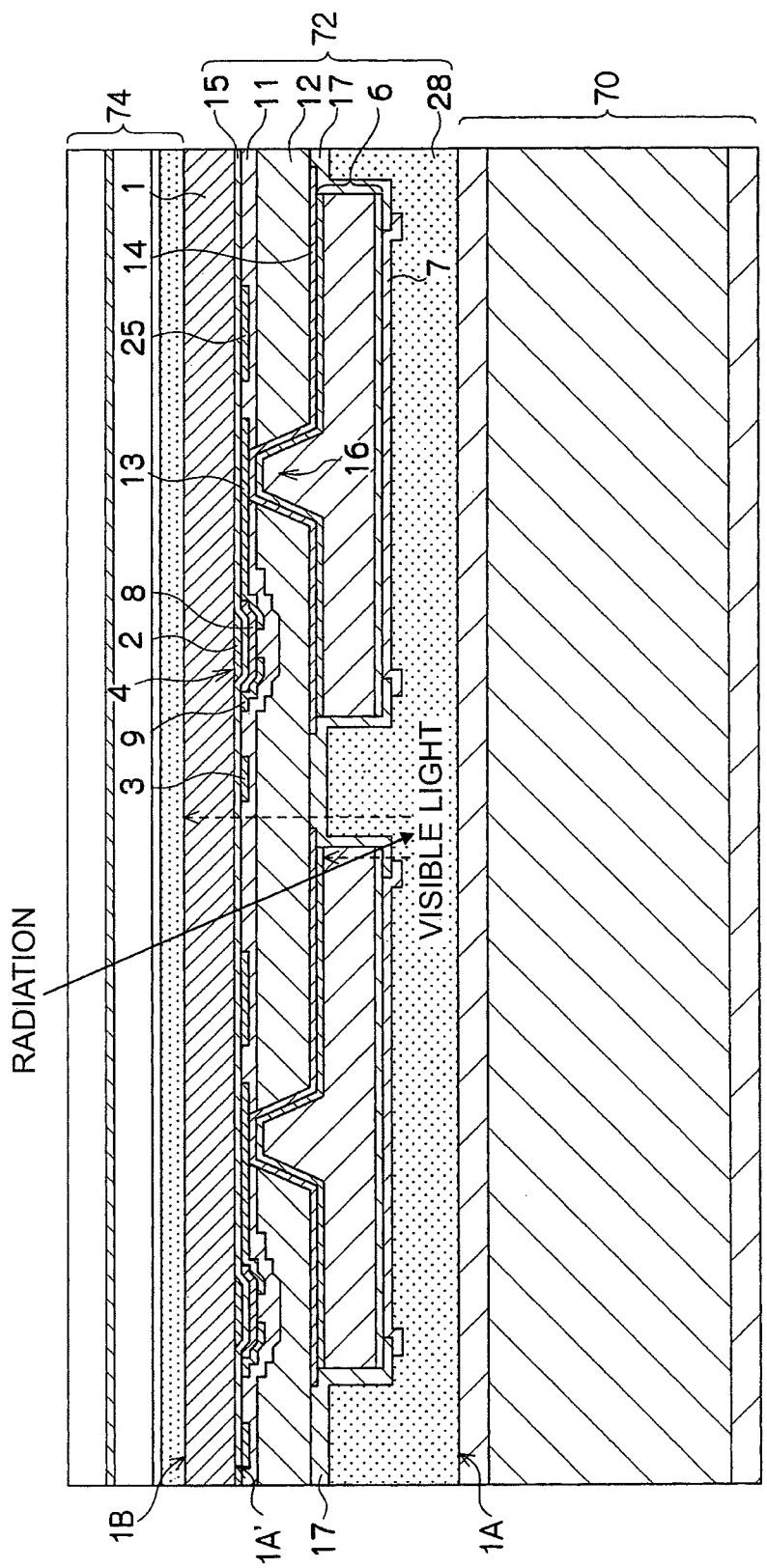
FIG. 5 is a diagram showing the configuration of the radiation detector according to the first exemplary embodiment.

Accordingly, radiation detecting pixels are formed on the side of a first surface 1A' of the substrate 1. In the photosensor-attached TFT array substrate 72 that is formed in the above-described way, as shown in FIG. 5, the scintillator 70 is bonded to the side of the first surface 1A'. The scintillator 70 is made of GOS and is bonded using an adhesive resin 28 having a low light absorbing property. As shown in FIG. 5, on the side of a surface 1B (a surface 1B different from the first surface 1A') that is opposite to the first surface 1A', the AEC photosensor array substrate 74 is provided. With respect to the photosensor-attached TFT array substrate 72, a surface of the side of the scintillator 70 is called a "first surface" and a surface of the side of the AEC photosensor array substrate 74 is called a "second surface." The photosensor-attached TFT array substrate 72 corresponds to the first substrate of the present invention. The AEC photosensor array substrate 74 corresponds to a second substrate of the present invention.

Next, an example of a process of manufacturing the radiation detection element of the photosensor-attached TFT array substrate 72 according to the first exemplary embodiment will be described with reference to (1) to (9) of FIG. 6.

Figure 6:
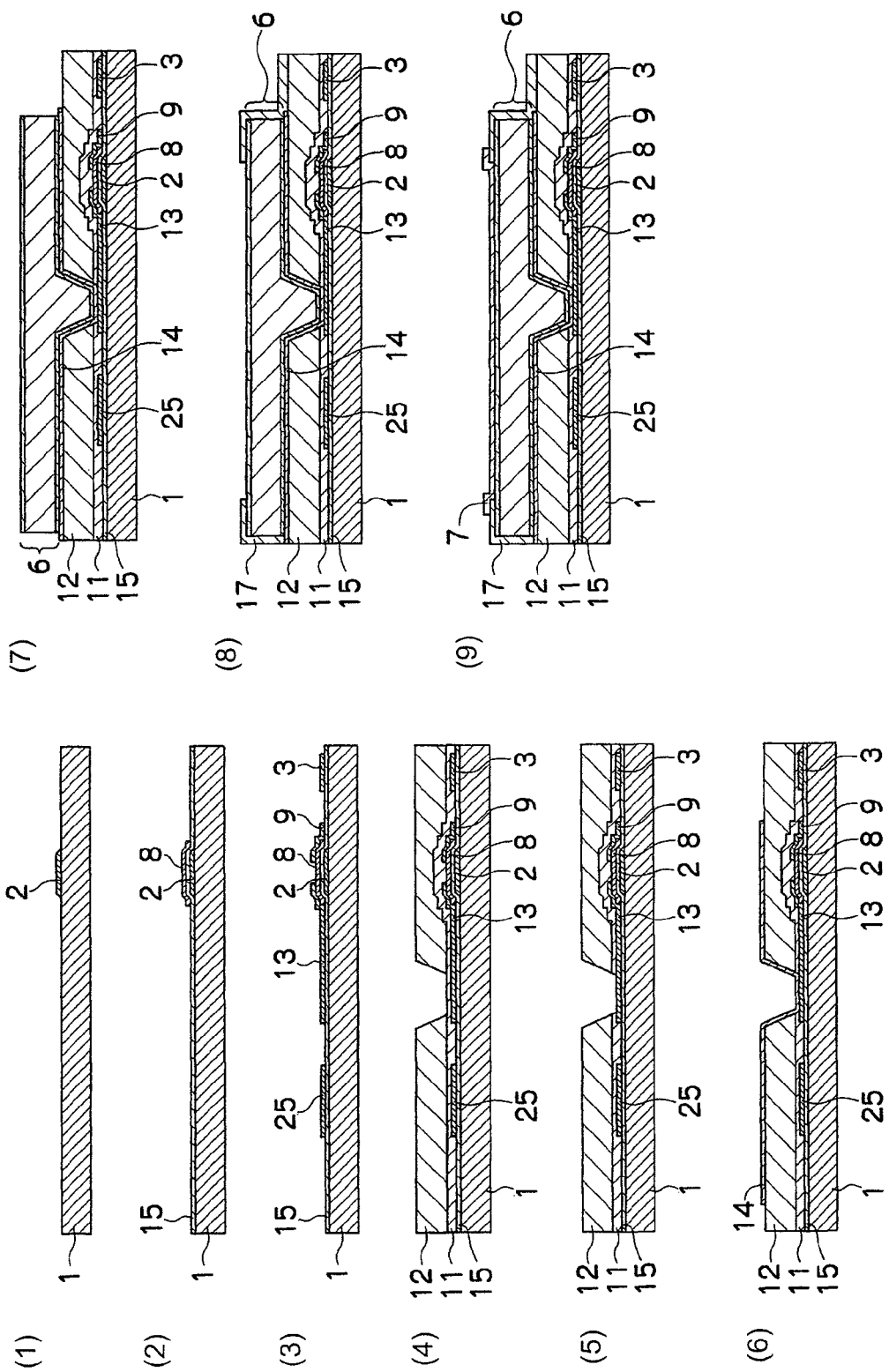
FIG. 6 is a diagram showing an example of a process of manufacturing a radiation detection element of a photosensor-attached TFT array substrate according to the first exemplary embodiment.

First, the gate electrode 2 and the scan line 101 that function as the first signal wiring layer are formed on the substrate 1 ((1) of FIG. 6). The first signal wiring layer is formed of a metal with low resistance such as Al and an Al alloy or a layered film with a barrier metal layer formed of a metal with a high melting point. The thickness of the first signal wiring layer is about 100 nm to 300 nm, and the first signal wiring layer is deposited on the substrate 1 using a sputtering method. Next, a resist film is patterned using photolithography. Next, the metal film is patterned using a wet etching method based on etchant for Al or a dry etching method. Next, the resist is removed and the first signal wiring layer is formed.

Next, the insulating film 15, the semiconductor active layer 8, and the contact layer (not shown in the drawings) are sequentially deposited on the first signal wiring layer (refer to (2) of FIG. 6). The insulating film 15 is made of $SiN_x$ and the thickness of the insulating film 15 is 200 nm to 600 nm. The semiconductor active layer 8 is made of amorphous silicon and the thickness of the semiconductor active layer 8 is about 20 nm to 200 nm. The contact layer is made of impurity doped amorphous silicon and the thickness of the contact layer is about 10 nm to 100 nm. The contact layer is deposited using a plasma-chemical vapor deposition (P-CVD) method. Next, similar to the first signal wiring layer, the resist is patterned using the photolithography. Next, the semiconductor active region is formed by selectively performing dry etching on the semiconductor active layer 8 and the contact layer based on the impurity doped semiconductor, with respect to the insulating film 15.

Next, on the insulating film 15 and the semiconductor active layer 8, the signal line 3, the source electrode 9, the drain electrode 13, and the common electrode line 25 that function as the second signal wiring layer are formed ((3) of FIG. 6). Similar to the first signal wiring layer, the second signal wiring layer is formed of a metal with low resistance such as Al and an Al alloy, a layered film with a barrier metal layer formed of a metal with a high melting point or a single metal film with a high melting point such as Mo. The thickness of the second signal wiring layer is about 100 nm to 300 nm. Similar to the first signal wiring layer, in the second signal wiring layer, the resist film is patterned using the photolithography, and the metal film is patterned using the wet etching method based on etchant for Al or the dry etching method. At this time, the insulating film 15 is prevented from being removed by selectively adopting the etching method. In the second signal wiring layer, the contact layer and the semiconductor active layer 8 are removed partially by the dry etching method and the channel region is formed.

Next, the TFT protective film 11 and the interlayer insulating film 12 are sequentially formed on the above-described layers ((4) of FIG. 6). The TFT protective film 11 and the interlayer insulating film 12 may be formed using any one of a single inorganic material substance, a layer of a protective insulating film made of an inorganic material and an interlayer insulating film made of an organic material, and a single interlayer insulating film made of an organic material. In the present exemplary embodiment, the photosensitive interlayer insulating film 12 and the TFT protective film 11 made of an inorganic material are layered to suppress capacitance between the lower electrode 14 and the common electrode line 25 of the lower layer, and to stabilize a characteristic of the TFT switch 4. For example, in the present exemplary embodiment, the TFT protective film 11 is formed using the CVD method. Next, a material of the photosensitive interlayer insulating film 12 that is a coated material is coated, prebaked, exposed, developed, and sintered.

Next, the TFT protective film 11 is patterned using the photolithography ((5) of FIG. 6). When the TFT protective film 11 is not disposed, this step does not need to be executed.

Next, a metal material such as an Al material or ITO is deposited on the above layer using the sputtering method, and the lower electrode 14 is formed. The thickness of the lower electrode 14 is about 20 nm to 200 nm. Next, the resist film is patterned using the photolithography, and the metal film is patterned using the wet etching method based on etchant for a metal or the dry etching method, and the lower electrode 14 is formed ((6) of FIG. 6).

Next, the semiconductor layer 6 is formed by sequentially depositing the $n^+$ layer, the layer, and the $p^+$ layer from the lower layer, using the CVD method ((7) of FIG. 6). The thickness of the $n^+$ layer is 50 nm to 500 nm, the thickness of the i layer is 0.2 μm to 2 μm, and the thickness of the $p^+$ layer is 50 nm to 500 nm. The semiconductor layer 6 is formed by sequentially layering the individual layers, performing patterning using the photolithography, and selectively etching the interlayer insulating film 12 of the lower layer using the dry etching or the wet etching.

In this case, the $n^+$ layer, the i layer, and the $p^+$ layer are sequentially layered. However, the semiconductor layer 6 may be configured as a PIN diode and the $p^+$ layer, the i layer, and the $n^+$ layer may be sequentially layered.

Next, the protective insulating film 17 made of the $SiN_x$ film is deposited using the CVD method to cover the semiconductor layer 6, and the thickness of the protective insulating film is about 100 nm to 300 nm. The patterning is performed using the photolithography, the dry etching method, and the opening is formed ((8) of FIG. 6). In this case, the film is formed of $SiN_x$ using the CVD method. However, since any insulating material may be applied, the film material is not limited to $SiN_x$.

Next, a connection portion with the upper electrode 7 and the common electrode line 25 is formed (refer to (9) of FIG. 6). The connection portion with the upper electrode 7 and the common electrode line 25 is formed by depositing a transparent electrode material such as ITO on the layer formed in the above-described way, using the sputtering method. The thickness of the connection portion is about 20 nm to 200 nm. The patterning is performed using the photolithography and the upper electrode 7 is patterned using the wet etching method based on etchant for the ITO or the dry etching method. At this time, the protective insulating film 17 of the lower layer is prevented from being damaged by selectively adopting etching.

Finally, the scintillator 70 made of GOS is bonded to the photosensor-attached TFT array substrate 72 formed in the above-described way using the adhesive resin 28. In addition, the AEC photosensor array substrate 74 is bonded. Thereby, the radiation detection element 10 shown in FIG. 5 is formed.

Figure 7:
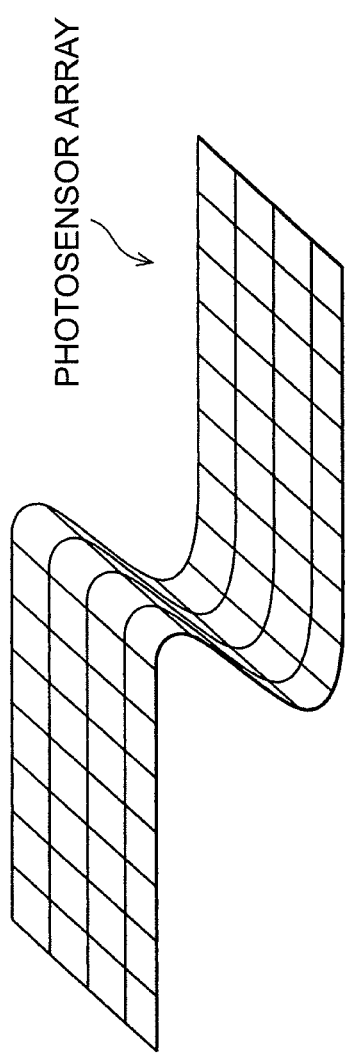
FIG. 7 is a diagram showing an example of a sheet photosensor array according to the first exemplary embodiment.

Next, the AEC photosensor array substrate 74 will be described. The AEC photosensor array substrate 74 is configured to include a resin substrate. The AEC photosensor array substrate 74 is provided on the side of the "second surface" of the photosensor-attached TFT array substrate 72. In the AEC photosensor array substrate 74, plural photosensors are provided. The photosensor generates charges by irradiating the light converted by the scintillator 70 onto the side of the first surface as shown in FIG. 1 and irradiating the light emitted from the second surface. Namely, the photosensor is a radiation irradiation detecting sensor. The photosensor does not need to perform high-precision light detection like the TFT array. Accordingly, a sheet-like photosensor array (shown in FIG. 7) that is described in Japanese Patent Application Laid-Open (JP-A) No. 9-307088 may be used. Thereby, in the present exemplary embodiment, radiation irradiation amount detection (AEC) may be performed at a low cost.

Figure 8B:
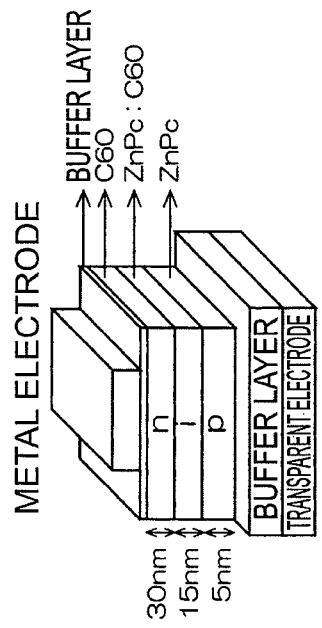
FIG. 8A and FIG. 8B are diagrams showing an example of a photoelectric conversion film that contains an organic thin-film material according to the first exemplary embodiment.
Figure 8A:
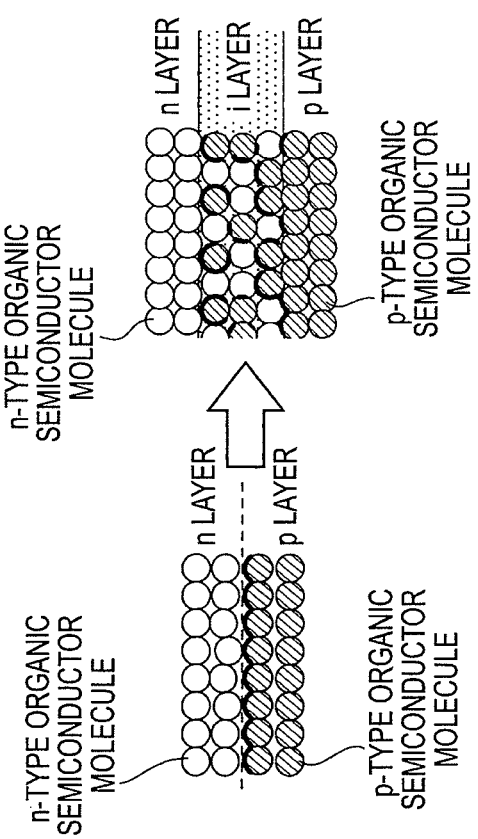

In the photosensor layer, a photoelectric conversion film containing an organic thin-film material shown in FIG. 8A and FIG. 8B is more preferable than the PIN-type and MIS-type photodiodes using a-Si. As compared with the PIN-type photodiode or the MIS-type photodiode, the photoelectric conversion film containing the organic thin-film material is advantageous in that a manufacturing cost may be reduced and flexibility is high. A photoelectric conversion film containing an inorganic thin-film material such as IGZO may be used in the photosensor layer. Each of the photosensors that are provided in the AEC photosensor array substrate 74 is used as the radiation irradiation detecting sensor as described above. Each of the photosensors is connected to each of radiation irradiation detecting lines (refer to FIG. 9B). Namely, each of the radiation irradiation detecting lines is supplied with an electric signal according to the charges generated in the connected photosensor. Each of the photosensors is connected to a radiation irradiation control device (not shown in the drawings) through each of the radiation irradiation detecting lines. In the present exemplary embodiment, the radiation irradiation control device detects the radiation irradiation amount, on the basis of the electric signal from the photosensor. The radiation irradiation control device controls a radiation source (not shown in the drawings) to irradiate the radiation, on the basis of the detected radiation irradiation amount.

Note that the photosensor (radiation irradiation detecting sensor) may be used to detect start of irradiation of the radiation, completion of the irradiation of the radiation, and an amount of irradiated radiation.

As described above, in the present exemplary embodiment, the scintillator 70 is provided on the side of the first surface of the photosensor-attached TFT array substrate 72 (refer to the schematic view shown in FIG. 9A). In the present exemplary embodiment, the AEC photosensor array substrate 74 (refer to the schematic view shown in FIG. 9B) is provided on the side of the second surface of the photosensor-attached TFT array substrate 72.

Next, an operation principle of the radiation image detection device 100 that has the above structure will be described.

When the X-rays are irradiated from the upper side of FIG. 5 (FIG. 1), the irradiated X-rays are absorbed into the scintillator 70 and are converted into visible light (radiation having the second wavelength). The X-rays may be irradiated from the lower side of FIG. 5 (FIG. 1). Even in this case, the irradiated X-rays are absorbed into the scintillator 70 and are converted into visible light. The amount of light that is generated from the scintillator 70 is 0.5 $\mu W/cm^2$ to 2 $\mu W/cm^2$, in the case in which common X-ray imaging for medical diagnosis is used. The generated light passes through the layer of the adhesive resin 28 and illuminates the semiconductor layer 6 of the sensor unit 103 that is disposed in an array on the TFT array substrate. The part of the generated light reaches the AEC photosensor array substrate 74. The AEC photosensor array substrate 74 receives the part of the generated light.

In the radiation detector 10A, the semiconductor layer 6 is separated into a pixel unit. To the semiconductor layer 6, a predetermined bias voltage is applied from the upper electrode 7 through the common electrode line 25. When the light illuminates the semiconductor layer 6, the semiconductor layer 6 generates charges therein. For example, when the semiconductor layer 6 has the PIN structure layered in order of $n^+$-i-$p^+$ ($n^+$ amorphous silicon, amorphous silicon, and $p^+$ amorphous silicon) from the lower layer, a negative bias voltage is applied to the upper electrode 7. When the thickness of the i layer is about 1 $\mu$m, the applied bias voltage is about −5 V to −10 V. In the above state, when the light is not illuminated, only a current of several to several ten $\mu A/mm^2$ or less flows through the semiconductor layer 6. Meanwhile, in the above state, when the light is illuminated (100 $\mu W/cm^2$), a light current of about 0.3 $\mu A/mm^2$ is generated in the semiconductor layer 6. The generated charges are collected by the lower electrode 14. The lower electrode 14 is connected to the drain electrode 13 of the TFT switch 4. The source electrode 9 of the TFT switch 4 is connected to the signal line 3. When the image is detected, a negative bias is applied to the gate electrode 2 of the TFT switch 4, and the TFT switch 4 is maintained in an OFF state. As a result, the charges that are collected in the lower electrode 14 are accumulated.

When an image is read out, an ON signal (+10 V to 20 V) is sequentially applied to the gate electrode 2 of the TFT switch 4 through the scan line 101. When the TFT switches 4 are sequentially turned ON, an electric signal according to the charge amount accumulated in the lower electrode 14 is output to the signal line 3. The signal detecting circuit 105 detects the charge amount accumulated in each sensor unit 103 as information of each pixel constituting an image on the basis of the electric signal. Thereby, the radiation imaging device 100 according to the present exemplary embodiment may obtain image information that represents an image by the X-rays irradiated onto the radiation detector 10A.

Meanwhile, in the radiation detector 10A according to the present exemplary embodiment, the common electrode line 25 is formed on the side of the non-irradiation surface (downstream side of the visible light) of the visible light from the scintillator 30, with respect to the sensor unit 103. In the radiation detector 10A according to the present exemplary embodiment, a bias voltage is supplied to the upper electrode 7 through the contact holes 22A and 22B. Therefore, the light that is converted into the visible light by the scintillator 30 and illuminated onto the semiconductor layer 6 is prevented from being intercepted by the common electrode line 25. Accordingly, the radiation detector 10A according to the present exemplary embodiment may prevent light use efficiency from being lowered in the sensor unit 103.

In the radiation detector 10A according to the present exemplary embodiment, each of the photosensors (radiation irradiation detecting sensors) of the AEC photosensor array substrate 74 receives the light, the radiation irradiation amount (total irradiation amount) is detected, and the radiation source is controlled.

According to the radiation detector 10A in the present exemplary embodiment, the radiation detecting pixels and the radiation irradiation detecting sensors are provided on the different substrates, respectively. Accordingly, in the present exemplary embodiment, a yield of the radiation detecting pixels and a yield of the radiation irradiation detecting sensors may be separated from each other. Therefore, even when manufacturing defects occur in the radiation irradiation detecting sensors, in the present exemplary embodiment, only the AEC photosensor array substrate 74 becomes a defective substrate and the photosensor-attached TFT array substrate 72 does not become a defective substrate. Namely, in the present exemplary embodiment, when the manufacturing defects occur in the radiation irradiation detecting sensors, the photosensor-attached TFT array substrate 72 may not be discarded.

Therefore, in the present exemplary embodiment, a manufacturing cost may be reduced.

Further, according to the present exemplary embodiment, the radiation irradiation detecting sensors are not provided between the radiation detecting pixels. Accordingly, as compared with the conventional art where the AEC sensors (second radiation conversion elements) are formed in the gaps between the first radiation conversion elements (radiation detecting elements), an effective detection area of the radiation detecting pixels may be enlarged in the present exemplary embodiment. Therefore, the accuracy of radiation detection in the present exemplary embodiment may be improved.

According to the present exemplary embodiment, the AEC photosensor array substrate 74 where the plural radiation irradiation detecting sensors are disposed is provided on the side of the second surface of the photosensor-attached TFT array substrate 72. For this reason, in the present exemplary embodiment, the radiation having the second wavelength (for example, light) may be received at an amount greater than the amount of radiation in the case in which the AEC sensors are formed in the gaps between the radiation detecting TFTs. Therefore, in the present exemplary embodiment, radiation detection sensitivity becomes high. When the AEC sensors are formed in the gaps of the TFTs, the radiation having the second wavelength is received by the sensor unit of the AEC sensor with an area smaller than the gap where the AEC sensors are provided. On the other hand, in the present exemplary embodiment, the AEC sensor is disposed on the top surface of the TFT. Therefore, in the present exemplary embodiment, the AEC sensors may be disposed in the entire gaps of the TFTs, and the radiation having the second wavelength that is leaked from the gaps and is emitted may be received at a large amount.

In the present exemplary embodiment, the light that is converted by the same scintillator 70 (wavelength conversion unit) is detected by the radiation detecting pixel and the radiation irradiation detecting sensor. Therefore, in the present exemplary embodiment, as compared with the case in which the irradiation amount is detected by the external AEC sensor, the difference of the pixel detection and the radiation irradiation amount detection based on the irradiation conditions may be reduced.

[Second Exemplary Embodiment]

Figure 10:
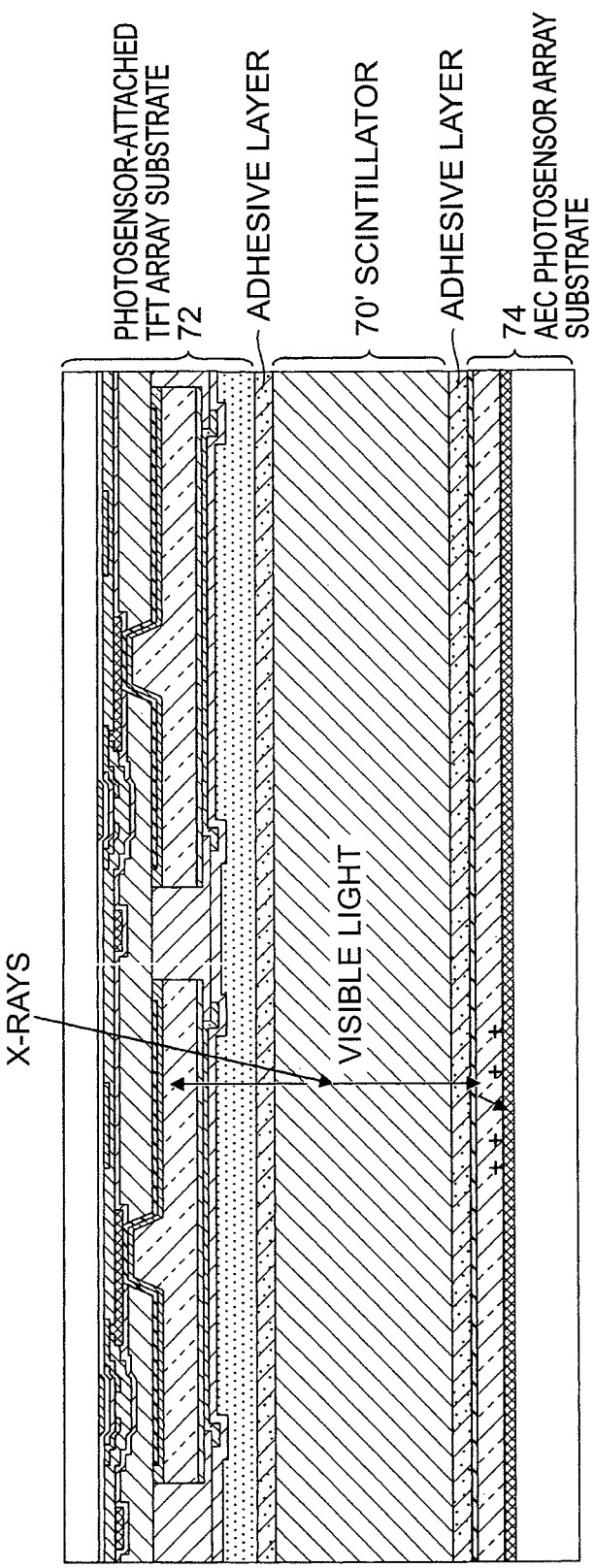
FIG. 10 is a diagram showing the configuration of a radiation detector of a radiation image detection device according to a secondary exemplary embodiment of the present invention.

Next, the second exemplary embodiment will be described. Note that the same configuration as those of the first exemplary embodiment are denoted by the same reference numerals. Similar to the first exemplary embodiment, an example of the case in which the radiation having the first wavelength is simply called "radiation (for example, X-rays)" and the radiation having the second wavelength different from the first wavelength is "light", will be described. However, the radiation having the first wavelength and the radiation having the second wavelength are not limited thereto. As shown in FIG. 10, a radiation detector 10B according to the second exemplary embodiment includes a scintillator 70', a photosensor-attached TFT array substrate 72, and an AEC photosensor array substrate 74.

The scintillator 70' according to the present exemplary embodiment does not include the reflector that is provided in the scintillator 70 according to the first exemplary embodiment, and the scintillator 70' emits light from both surfaces. Namely, the scintillator 70' according to the present exemplary embodiment converts the irradiated radiation into light and emits the light from both surfaces of the scintillator 70'. Note that the scintillator 70' according to the present exemplary embodiment corresponds to a wavelength conversion unit (wavelength conversion layer) of the present invention.

In the present exemplary embodiment, the photosensor-attached TFT array substrate 72 is provided on one surface of the scintillator 70'. Therefore, in the present exemplary embodiment, light that is emitted from one surface of the scintillator 70' illuminates the photosensor-attached TFT array substrate 72. Due thereto, each of the plural radiation detecting pixels that are provided in the photosensor-attached TFT array substrate 72 accumulates the charges that are generated by illumination of the light emitted from one surface of the scintillator 70'. Similar to the first exemplary embodiment, the radiation detecting pixels according to the present exemplary embodiment include switching elements to read the accumulated charges.

In the present exemplary embodiment, the AEC photosensor array substrate 74 is provided on the other surface of the scintillator 70'. In the present exemplary embodiment, the light that is emitted from the other surface illuminates the AEC photosensor array substrate 74. Thereby, each of the plural photosensors (radiation irradiation detecting sensors) that are provided in the AEC photosensor array substrate 74 generates charges by illumination of the light emitted from the other surface of the scintillator 70'.

The radiation irradiation detecting sensor according to the first exemplary embodiment receives only the light that is leaked from the gap of the photosensor-attached TFT array substrate 72. However, the radiation irradiation detecting sensor according to the present exemplary embodiment may receive all of the light that is emitted from the other surface of the scintillator 70'. Therefore, detection sensitivity in the present exemplary embodiment becomes high.

Figure 11:
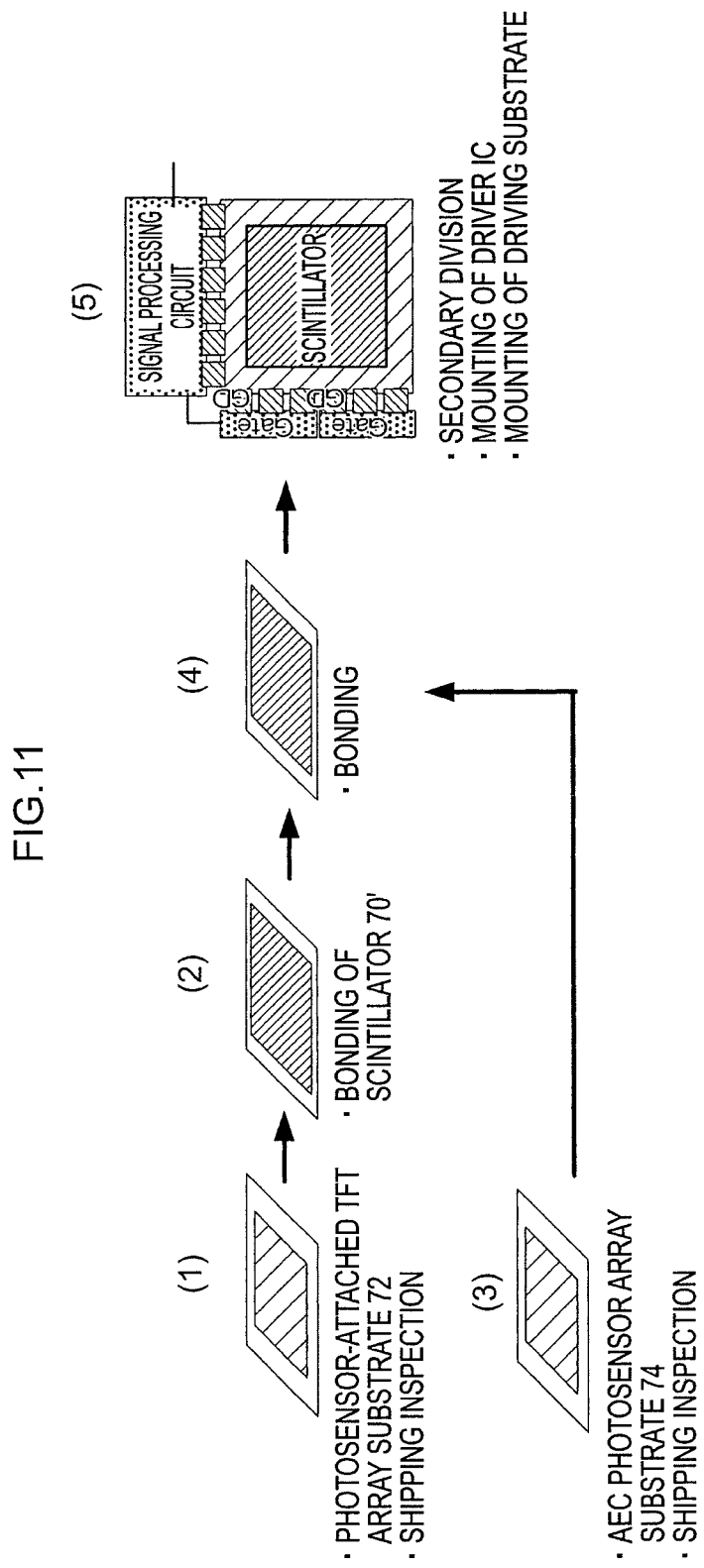
FIG. 11 is a schematic view illustrating a method of manufacturing a radiation image detection device according to the second exemplary embodiment.
Figure 12:
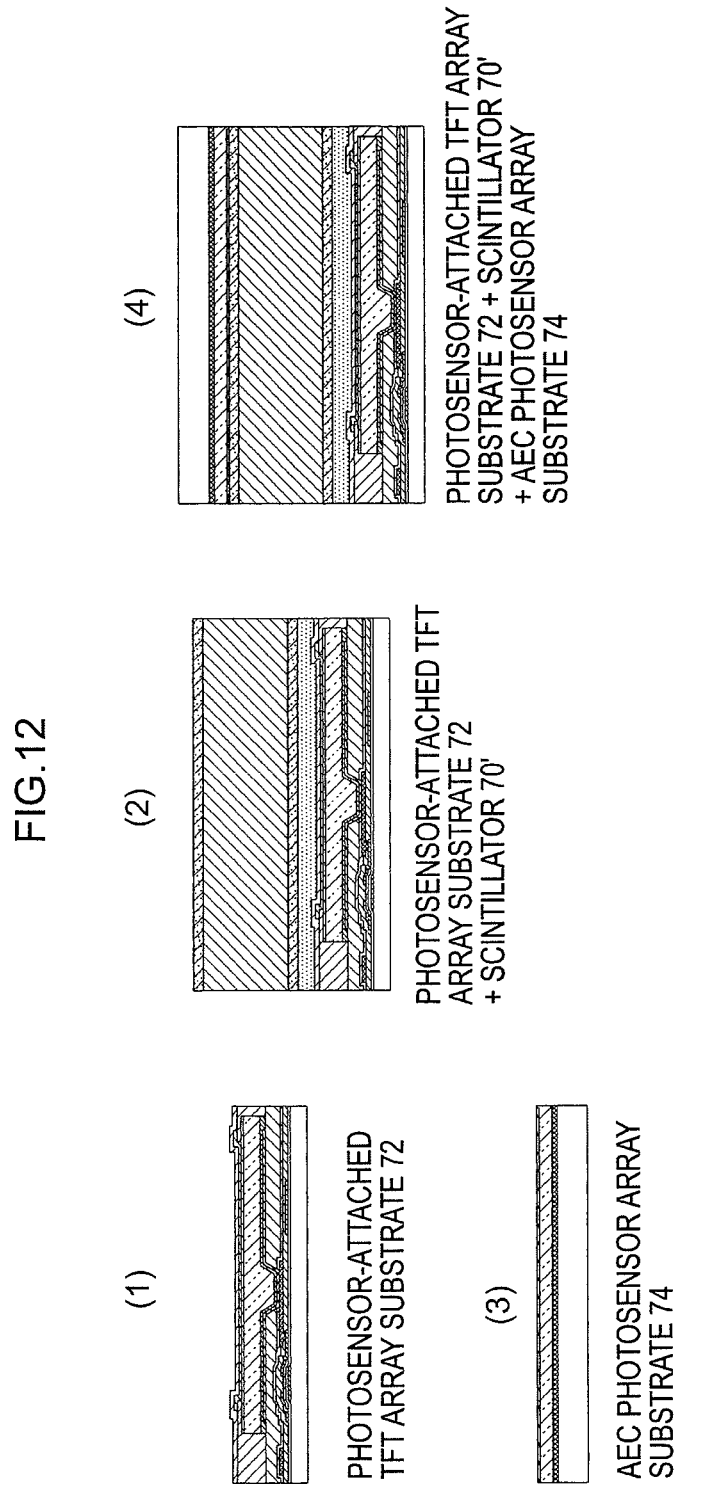
FIG. 12 is a cross-sectional view of a material that is manufactured in each step of the manufacturing method according to the second exemplary embodiment.

Next, a method of manufacturing a radiation image detection device according to the present exemplary embodiment will be described. FIG. 11 schematically shows the method of manufacturing a radiation image detection device according to the present exemplary embodiment. FIG. 12 is a cross-sectional view of each step of the manufacturing method.

First, the photosensor-attached TFT array substrate 72 is manufactured and the manufactured photosensor-attached TFT array substrate 72 is inspected ((1) of FIG. 11 and (1) of FIG. 12).

Next, the photosensor-attached TFT array substrate 72, that has been determined as a non-defective product (not a defective product) at the time of the inspection, is bonded to the scintillator 70' by using the adhesive as described above ((2) of FIG. 11 and (2) of FIG. 12).

The AEC photosensor array substrate 74 is manufactured and the manufactured AEC photosensor array substrate 74 is inspected ((3) of FIG. 11 and (3) of FIG. 12).

Next, the AEC photosensor array substrate 74, that has been determined as a non-defective product (not a defective product) at the time of the inspection, is bonded to the scintillator 70' where the manufactured photosensor-attached TFT array substrate 72 is bonded, by using the adhesive as described above ((4) of FIG. 11 and (4) of FIG. 12).

The secondary division is performed, the individual terminals are electrically and physically separated, and a gate driver and an amplifier IC are mounted (TCP packaging: mounting of an IC mounted on a tape carrier package). Finally, a circuit board (gate drive board and signal detecting circuit board) is mounted and the radiation detector 10B of the radiation image detection device is produced ((5) of FIG. 11).

Figure 13B:
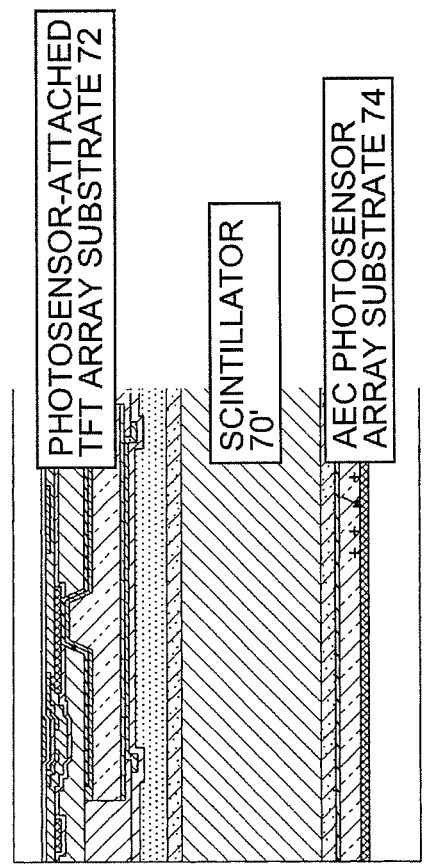

In the present exemplary embodiment, as described above, the photosensor-attached TFT array substrate 72 shown in FIG. 9A and the AEC photosensor array substrate 74 shown in FIG. 9B are disposed on the upper and lower sides of one scintillator 70', as shown in FIG. 13A and FIG. 13B.

Next, an operation of the radiation image detection device according to the present exemplary embodiment will be described.

When the X-rays are irradiated from the upper side of FIG. 10, the irradiated X-rays are absorbed into the scintillator 70' and are converted into visible light (radiation having the second wavelength). The X-rays may be irradiated from the lower side of FIG. 10. Even in this case, the irradiated X-rays are absorbed into the scintillator 70' and are converted into visible light. The amount of light that is generated from the scintillator 70' is 0.5 $\mu W/cm^2$ to 2 $\mu W/cm^2$, in the case in which common X-ray imaging for medical diagnosis is used. The generated light is illuminated from both surfaces of the scintillator 70'. The generated light (light illuminated from one surface of the scintillator 70') passes through the layer of the adhesive resin 28 and illuminates the semiconductor layer 6 of the sensor unit 103 that is disposed in an array shape on the TFT array substrate. The generated light (light illuminated from the other surface of the scintillator 70') reaches the AEC photosensor array substrate 74. The AEC photosensor array substrate 74 receives the part of the generated light.

In the radiation detector 10B, the semiconductor layer 6 is separated into a pixel unit. To the semiconductor layer 6, a predetermined bias voltage is applied from the upper electrode 7 through the common electrode line 25. When the light illuminates the semiconductor layer 6, the semiconductor layer 6 generates charges therein. For example, when the semiconductor layer 6 has the PIN structure layered in order of $n^+$-i-$p^+$ ($n^+$ amorphous silicon, amorphous silicon, and $p^+$ amorphous silicon) from the lower layer, a negative bias voltage is applied to the upper electrode 7. When the thickness of the i layer is about 1 $\mu$m, the applied bias voltage is about $-5$ V to $-10$ V. In the above state, when the light is not illuminated, only a current of several to several ten $pA/mm^2$ or less flows through the semiconductor layer 6. Meanwhile, in the above state, when the light is illuminated (100 $\mu W/cm^2$), a light current of about 0.3 $\mu A/mm^2$ is generated in the semiconductor layer 6. The generated charges are collected by the lower electrode 14. The lower electrode 14 is connected to the drain electrode 13 of the TFT switch 4. The source electrode 9 of the TFT switch 4 is connected to the signal line 3. When the image is detected, a negative bias is applied to the gate electrode 2 of the TFT switch 4 and the TFT switch 4 is maintained in an OFF state. Accordingly, the collected charges are accumulated in the lower electrode 14.

When an image is read out, an ON signal (+10 V to 20 V) is sequentially applied to the gate electrode 2 of the TFT switch 4 through the scan line 101. When the TFT switches 4 are sequentially turned ON, an electric signal according to the charge amount accumulated in the lower electrode 14 is output to the signal line 3. The signal detecting circuit 105 detects the charge amount accumulated in each sensor unit 103 as information of each pixel constituting an image on the basis of the electric signal output to the signal line 3. Thereby, the radiation imaging device 100 according to the present exemplary embodiment may obtain image information that represents an image by the X-rays irradiated onto the radiation detector 10B.

Meanwhile, in the radiation detector 10B according to the present exemplary embodiment, each of the photosensors (radiation irradiation detecting sensors) of the AEC photosensor-attached array substrate 74 receives light, the radiation irradiation amount (total irradiation amount) is detected, and the radiation source is controlled.

Note that the photosensor (radiation irradiation detecting sensor) may be used to detect start of irradiation of the radiation, completion of the irradiation of the radiation, and an amount of irradiated radiation.

According to the radiation detector 10B in the present exemplary embodiment, the radiation detecting pixels and the radiation irradiation detecting sensors are provided on the different substrates, respectively. Accordingly, in the present exemplary embodiment, a yield of the radiation detecting pixels and a yield of the radiation irradiation detecting sensors may be separated from each other. Therefore, even when manufacturing defects occur in the radiation irradiation detecting sensors, only the AEC photosensor array substrate 74 may become a defective substrate in the present exemplary embodiment. Therefore, the photosensor-attached TFT array substrate 72 does not become a defective substrate. Namely, in the present exemplary embodiment, when the manufacturing defects occur in the radiation irradiation detecting sensors, the photosensor-attached TFT array substrate 72 is not discarded.

Therefore, in the present exemplary embodiment, a manufacturing cost may be reduced.

According to the present exemplary embodiment, the radiation irradiation detecting sensors are not provided between the radiation detecting pixels. Accordingly, as compared with the conventional art where the AEC sensors (second radiation conversion elements) are formed in the gaps between the first radiation conversion elements (radiation detecting elements), an effective detection area of the radiation detecting pixels may be enlarged in the present exemplary embodiment. Therefore, the accuracy of radiation detection in the present exemplary embodiment may be improved.

According to the present exemplary embodiment, the AEC photosensor array substrate 74 where the plural radiation irradiation detecting sensors are disposed is provided on the side of the other surface of the scintillator 70'. Accordingly, in the present exemplary embodiment, the radiation having the second wavelength may be received at an amount greater than the amount of radiation in the case in which the AEC sensors are formed in the gaps between the radiation detecting TFTs. Therefore, in the present exemplary embodiment, radiation detection sensitivity becomes high. When the AEC sensors are formed in the gaps of the TFTs, the radiation having the second wavelength is received by the sensor unit of the AEC sensor with an area smaller than the gap where the AEC sensors are provided. On the other hand, in the present exemplary embodiment, the AEC sensor is disposed on the top surface of the TFT. Therefore, in the present exemplary embodiment, the AEC sensors may be disposed in the entire gaps of the TFTs, and the radiation having the second wavelength that is converted by the scintillator 70' and is emitted from the other surface may be received at a large amount. As compared with the first exemplary embodiment, a large amount of light may be received in the present exemplary embodiment. For this reason, detection sensitivity in the present exemplary embodiment is higher than the detection sensitivity in the first exemplary embodiment.

In the present exemplary embodiment, the light that is converted by the same scintillator 70' (wavelength conversion unit) is detected by the radiation detecting pixel and the radiation irradiation detecting sensor. Therefore, in the present exemplary embodiment, as compared with the case in which the radiation is detected by the external AEC sensor, the difference of the pixel detection and the radiation irradiation amount detection based on the irradiation conditions may be reduced.

According to the present exemplary embodiment, absorption loss of radiation based on the AEC photosensor array substrate 74 is removed, and an image quality is improved. According to the present exemplary embodiment, the AEC photosensor array substrate 74 is provided on the non-irradiation side opposite to the irradiation side of the radiation. However, as described above, in the present exemplary embodiment, the light that is converted by the same scintillator 70' is detected by the radiation detecting pixel and the radiation irradiation detecting sensor. Therefore, in the present exemplary embodiment, detection accuracy of the radiation irradiation amount may be suppressed from being deteriorated due to radiation absorption in the photosensor-attached TFT array substrate 72.

The configuration of the radiation imaging device 100 and the configuration of the radiation detection element 10A that are described in the first exemplary embodiment and the configuration of the radiation imaging device and the configuration of the radiation detection element 10B that are described in the second exemplary embodiment are only exemplary. Therefore, various changes may be appropriately made within a range that does not depart from the spirit and scope of the present invention.

For example, in the first and second exemplary embodiments, the radiation irradiation detecting sensors may be provided on the entire surface of the AEC photosensor array substrate 74. The radiation irradiation detecting sensors may be provided in a part of the AEC photosensor array substrate 74.

What is claimed is:

1. A radiation detector, comprising:
    a wavelength conversion unit that converts irradiated radiation having a first wavelength into radiation having a second wavelength, said second wavelength corresponding to light;
    a first substrate that has a first surface and a second surface different from the first surface;
    a plurality of radiation detecting pixels, disposed in a matrix on the first surface, that accumulate charges generated due to irradiation of the radiation having the second wavelength, and that include switching elements to read out the accumulated charges;
    a plurality of scan lines, provided on the first surface, through which a control signal, that switches each switching element provided in each radiation detecting pixel, flows;
    a plurality of signal lines, provided on the first surface, through which an electric signal flows, the electric signal corresponding to the charges accumulated in each radiation detecting pixel according to a switching state of each switching element;
    a second substrate, provided on the second surface of the first substrate, that includes a plurality of radiation irradiation detecting sensors, disposed in a matrix on an entire surface of the second substrate, that generate charges due to irradiation of the radiation having the second wavelength corresponding to light being irradiated onto the first surface and emitted from the second surface;
    radiation irradiation detecting lines, each connected to one of the radiation irradiation detecting sensors, through which electric signals corresponding to the charges generated by the radiation irradiation detecting sensors flow; and
    a radiation irradiation control device, connected to each of the radiation irradiation detecting lines, that detects an irradiation amount of radiation having the first wavelength, and controls a radiation source to irradiate the radiation having the first wavelength on the basis of the detected irradiation amount.

2. The radiation detector of claim 1, wherein the second substrate includes a resin substrate.

3. The radiation detector of claim 1, wherein the radiation irradiation detecting sensors include an organic material.

4. The radiation detector of claim 1, wherein the radiation irradiation detecting sensors include an inorganic material.

5. The radiation detector of claim 1, wherein the wavelength conversion unit includes GOS.

6. The radiation detector of claim 1, wherein the wavelength conversion unit includes CsI.

7. The radiation detector of claim 1, wherein the radiation irradiation detecting sensors detect at least one of, start of irradiation of the radiation, completion of the irradiation of the radiation, and an amount of irradiated radiation.

8. The radiation detector of claim 1, wherein the second substrate is positioned such that each detection region of the irradiation detecting sensor, provided on the second substrate, corresponds to each detection region of a pixel group formed by a number of the radiation detecting pixels, provided on the first substrate.

9. A radiation detector, comprising:
    a wavelength conversion unit, having a first surface and a second surface, that converts irradiated radiation having a first wavelength into radiation having a second wavelength and that emits the radiation having the second wavelength from both surfaces, wherein said second wavelength corresponds to light;
    a first substrate that is provided on the first surface of the wavelength conversion unit;
    a plurality of radiation detecting pixels, disposed in a matrix on the first substrate, that accumulate charges generated due to irradiation of the radiation emitted from the first surface of the wavelength conversion unit and having the second wavelength, and that include switching elements to read out the accumulated charges;
    a plurality of scan lines, provided on the first substrate, through which a control signal, that switches each switching element provided in each radiation detecting pixel, flows;
    a plurality of signal lines, provided on the first substrate, through which an electric signal flows, the electric signal corresponding to the charges accumulated in each radiation detecting pixel according to a switching state of each switching element;

a second substrate, provided on the second surface of the wavelength conversion unit, that includes a plurality of radiation irradiation detecting sensors, disposed in a matrix on an entire surface of the second substrate, that generate charges due to irradiation of the radiation having the second wavelength corresponding to light emitted from the second surface of the wavelength conversion unit;

radiation irradiation detecting lines, each connected to one of the radiation irradiation detecting sensors, through which electric signals corresponding to the charges generated by the radiation irradiation detecting sensors flow; and a radiation irradiation control device, connected to each of the radiation irradiation detecting lines, that detects an irradiation amount of radiation having the first wavelength, and controls a radiation source to irradiate the radiation having the first wavelength on the basis of the detected irradiation amount.

10. The radiation detector of claim 9, wherein the second substrate includes a resin substrate.

11. The radiation detector of claim 9, wherein the radiation irradiation detecting sensors include an organic material.

12. The radiation detector of claim 9, wherein the radiation irradiation detecting sensors include an inorganic material.

13. The radiation detector of claim 9, wherein the wavelength conversion unit includes GOS.

14. The radiation detector of claim 9, wherein the wavelength conversion unit includes CsI.

15. The radiation detector of claim 9, wherein the radiation irradiation detecting sensors detect at least one of, start of irradiation of the radiation, completion of the irradiation of the radiation, and an amount of irradiated radiation.

16. The radiation detector of claim 9, wherein the second substrate is positioned such that each detection region of the irradiation detecting sensor, provided on the second substrate, corresponds to each detection region of a pixel group formed by a number of the radiation detecting pixels, provided on the first substrate.

* * * * *